(12) United States Patent
Havlicek et al.

(10) Patent No.: US 6,537,516 B2
(45) Date of Patent: Mar. 25, 2003

(54) INTEGRATED METHOD OF PRECONDITIONING A RESIN FOR HYDROGEN PEROXIDE PURIFICATION AND PURIFYING HYDROGEN PEROXIDE

(75) Inventors: Mary Dykstra Havlicek, Richardson, TX (US); Joe G. Hoffman, Dallas, TX (US); Wallace Yuan, Irvine, CA (US)

(73) Assignee: Air Liquide America Corporation, Houston, TX (US)

( * ) Notice: Subject to any disclaimer, the term of this patent is extended or adjusted under 35 U.S.C. 154(b) by 68 days.

(21) Appl. No.: 09/824,767

(22) Filed: Apr. 4, 2001

(65) Prior Publication Data

US 2003/0017103 A1 Jan. 23, 2003

(51) Int. Cl.⁷ .............................................. C01B 15/013
(52) U.S. Cl. ........................ 423/584; 210/690; 210/908; 423/586
(58) Field of Search ................................ 423/584, 586; 210/690, 908

(56) References Cited

U.S. PATENT DOCUMENTS

| | | | | |
|---|---|---|---|---|
| 3,556,727 A | * | 1/1971 | Thirion ........................ 423/584 |
| 5,268,160 A | * | 12/1993 | Albal et al. ................... 423/584 |
| 5,851,505 A | * | 12/1998 | Nishide et al. ............... 423/584 |
| 6,224,845 B1 | * | 5/2001 | Pennetreau et al. .......... 423/584 |
| 6,333,018 B2 | * | 12/2001 | Bianchi et al. ............... 423/584 |

* cited by examiner

Primary Examiner—Stanley S Silverman
Assistant Examiner—Maribel Medina
(74) Attorney, Agent, or Firm—Linda K. Rusell

(57) ABSTRACT

A method of integrated resin preconditioning and hydrogen peroxide purification is provided. The method includes preconditioning a resin by washing the resin with deionized water to produce a washed resin, and contacting an effective amount of a preconditioning hydrogen peroxide solution with the washed resin to remove impurities from the washed resin, thereby producing a preconditioned resin. The method further includes passing a hydrogen peroxide solution to be purified through a bed of the preconditioned resin to form a hydrogen peroxide solution having a TOC content lower than a TOC content of the hydrogen peroxide solution to be purified, and passing the hydrogen peroxide solution having a TOC content lower than the TOC content of the hydrogen peroxide solution to be purified through one or more ion-exchange resin beds or directing the hydrogen peroxide solution having a TOC content lower than the TOC content of the hydrogen peroxide solution to be purified to a point of use in a semiconductor manufacturing facility the. The preconditioning hydrogen peroxide solution does not pass through the ion exchange resin beds and is not directed to the point of use.

20 Claims, 4 Drawing Sheets

INTEGRATED METHOD OF PRECONDITIONING A RESIN FOR HYDROGEN PEROXIDE PURIFICATION AND PURIFYING HYDROGEN PEROXIDE

BACKGROUND OF THE INVENTION

1. Field of the Invention

This invention relates to a method of preconditioning a resin and removing total organic carbon (TOC) impurities from a hydrogen peroxide solution using the preconditioned resin. The invention has particular applicability in the semiconductor manufacturing industry for the removal of total organic carbon impurities from a hydrogen peroxide solution.

2. Description of the Related Art

Hydrogen peroxide ($H_2O_2$) is an important chemical in the semiconductor manufacturing industry. It is commonly used in solutions employed in wafer cleaning processes which are conducted in wet processing stations. For example, the well known piranha cleaning process employs a 30% solution of hydrogen peroxide and sulfuric acid ($H_2SO_4$) in a ratio of 3:7. Other processes employing hydrogen peroxide solutions include, for example, the RCA SC-1 cleaning process which involves a solution of ammonium hydroxide ($NH_4OH$) and hydrogen peroxide in a ratio of 5:1:1, and the RCA SC-2 clean, which uses a solution of hydrochloric acid (HCl) and hydrogen peroxide in a ratio of 6:1:1.

To reduce the probability of device failure, it is important in semiconductor device fabrication that the materials which contact the wafers being treated be of very high purity. The extreme purity levels required in semiconductor manufacturing are rare and unique among industrial processes. While existing techniques of purifying hydrogen peroxide may significantly reduce the amount of contaminants, solutions of even greater purity are desirable.

Commercial grade hydrogen peroxide is generally produced by the so-called anthraquinone method. This method involves auto-oxidation of anthraquinone, which results in the presence of large amounts of organic contaminants in solution. The contaminants may either originate from the anthraquinone or from the organic solvents used in preparing the hydrogen peroxide solution from the anthraquinone. Typical organic contaminants in hydrogen peroxide solutions include, for example, alcohols, aldehydes and other organic substances which typically cannot be effectively removed by ion exchange resins.

It is conventional practice to treat hydrogen peroxide prior to shipping to remove organic impurities. For example, it is known to remove organic contaminants by extraction with a water miscible organic solvent. However, the purified solution still contains organic impurities in amounts that are not acceptable for use in the semiconductor industry.

One method for significantly decreasing the amount of organic impurities in a hydrogen peroxide solution involves contacting the solution with a resin which can absorb the organic contaminants and separate them from the solution. Hydrogen peroxide solutions purified in this manner can achieve high purity levels with respect to TOC's.

There are, however, various problems associated with the use of absorbent resins to remove organic impurities from an aqueous hydrogen peroxide solution. For example, resins used to treat hydrogen peroxide for removal of impurities may contain metals and bases due to manufacturing and/or storage procedures. When the hydrogen peroxide solution is brought into contact with the resin, the solution is prone to decomposition. Such decomposition is further accelerated due to the basic nature of and presence of metals in the resin, which catalyze the hydrogen decomposition.

Decomposition of the hydrogen peroxide solution can be particularly problematic as a result of the exothermic nature of the reaction. The temperature near the zone of contact between the resin and the solution can increase very rapidly, increasing the rate of decomposition. This can result in a self-accelerating reaction, possibly terminating in an explosion of the purification equipment.

Thus, there remains a need for a resin-based method and system for removing organic impurities from a hydrogen peroxide solution in a safe and cost-effective manner.

Copending application Ser. No. 09/824,765 Attorney Docket No. 016499-526, the contents of which are hereby incorporated by reference in their entirety, provides novel methods of preconditioning a resin useful for removal of organic impurities from a hydrogen peroxide solution. The preconditioning method is based on treating a resin with a solution of a strong acid to remove contaminants such as metal impurities from the resin. Hydrogen peroxide decomposition upon contact with the resin during purification can thereby be minimized. This resin preconditioning method provides vast improvements over the methods previously known in the art. However, the method requires rinsing the resin with deionized water after the acid treatment and prior to passing a hydrogen peroxide solution to be purified through the resin.

It is highly desirable to conduct the resin preconditioning in situ in the unit in which the resin is to be utilized. However, the need for a rinsing step after the acid treatment in the above resin preconditioning method introduces downtime in operating the unit due to the extra rinsing step prior to hydrogen peroxide purification.

It is an object of the present invention to overcome or conspicuously ameliorate the problems with the related art. In particular, the invention effectively minimizes downtime in hydrogen peroxide purification and maximizes the efficiency of resin hydrogen peroxide units including in situ resin preconditioning.

Other objects and aspects of the present invention will become apparent to one of ordinary skill in the art on a review of the specification, drawings and claims appended hereto.

SUMMARY OF THE INVENTION

The present invention provides a method of purifying a hydrogen peroxide solution. The method comprises preconditioning a resin by a method comprising (i) washing the resin with deionized water to produce a washed resin, and (ii) contacting an effective amount of a preconditioning hydrogen peroxide solution with the washed resin to remove impurities from the washed resin, thereby producing a preconditioned resin.

The method also comprises passing a hydrogen peroxide solution to be purified through a bed of the preconditioned resin to form a hydrogen peroxide solution having a TOC content lower that a TOC content of the hydrogen peroxide solution to be purified, and passing the hydrogen peroxide solution having a TOC content lower than the TOC content of the hydrogen peroxide solution to be purified through one or more ion-exchange resin beds. The preconditioning hydrogen peroxide solution does not pass through the ion exchange resin beds.

In accordance with one aspect of the invention, the hydrogen peroxide solution having a TOC content lower than the TOC content of the hydrogen peroxide solution to be purified is directed to a point of use in a semiconductor manufacturing facility through a conduit disposed between the bed of preconditioned resin and the point of use, with or without passing the hydrogen peroxide solution having a TOC content lower than a TOC content of the hydrogen peroxide solution to be purified through one or more ion-exchange resin beds, wherein the preconditioning hydrogen peroxide solution does not pass through the one or more ion-exchange resin beds and is not directed to the point of use.

In accordance with a further aspect of the invention, the preconditioning hydrogen peroxide solution and the hydrogen peroxide solution to be purified are supplied from the same hydrogen peroxide source.

In accordance with a still further aspect of the invention, the preconditioned resin has a TOC removal capacity of about 50% or more of the resin's TOC removal capacity prior to preconditioning, and/or a residual impurity level of about 100 ppb or less.

In accordance with a still further aspect of the invention, a valve in a conduit between the resin bed and the ion-exchange resin beds is opened after resin preconditioning is completed.

In accordance with yet a further aspect of the invention, the preconditioning hydrogen peroxide solution is assayed after passage through the resin, and a valve is opened when a predetermined hydrogen peroxide concentration has been reached.

BRIEF DESCRIPTION OF THE DRAWINGS

The objects and advantages of the invention will become apparent from the following detailed description of the preferred embodiments thereof in connection with the accompanying drawings, in which.

DETAILED DESCRIPTION OF THE PREFERRED EMBODIMENTS OF THE INVENTION

Figure 1:
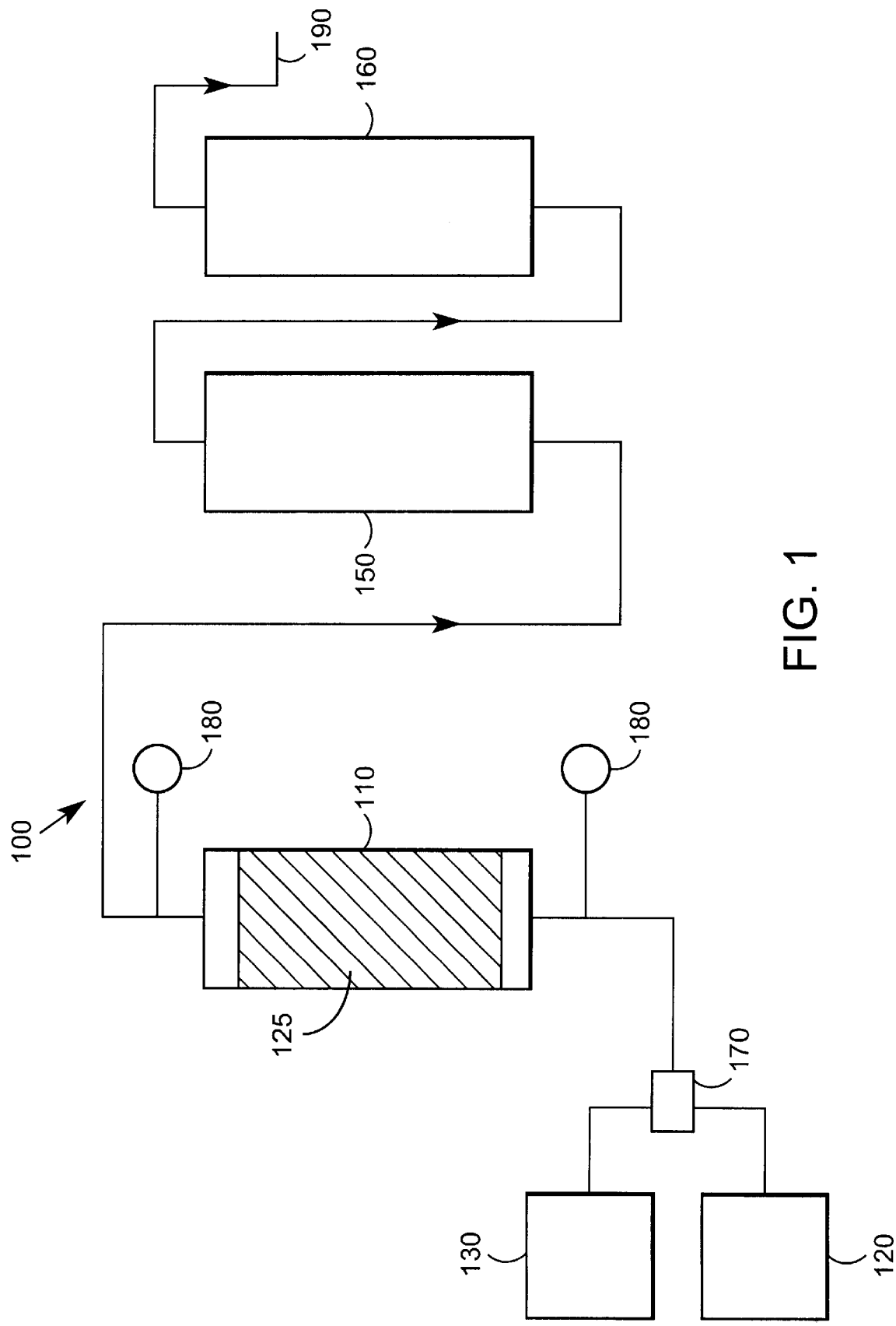
FIG. 1 is a schematic diagram for a resin pretreatment/hydrogen peroxide purification system according to the invention.

The invention will now be described with reference to exemplary embodiments thereof. A first aspect of the invention involves a method of preconditioning a resin which can be employed in the removal of organic impurities from a hydrogen peroxide solution.

The invention can be applied to any resin suitable for removing organic impurities from hydrogen peroxide solutions. Resins capable of adsorbing organic impurities which cannot be removed by ion-exchange resins are particularly suited for the preconditioning method according to the invention. Preconditioned hydrophobic resins have been found to work particularly well in removing organic impurities from hydrogen peroxide solutions. Application to hydrophylic resins is also expected to provide beneficial results. Of various commercially available resins, AMBERLITE XAD-4 and AMBERSORB 563, available from Rohm and Haas, have been found to work particularly well with the present invention.

One aspect of the invention provides a method for preconditioning a resin prior to utilization in removing organic impurities from a hydrogen peroxide solution. The method includes rinsing the resin with deionized water to remove impurities, such as metal impurities from the resin. The resin is then treated with a hydrogen peroxide solution to remove residual impurities which cannot be effectively removed from the resin by treatment with deionized water alone.

The preconditioning method can be practiced in a batch mode, a continuous flow mode, or a combination of batch and continuous flow modes.

In a continuous flow mode, the resin is disposed in a column. The material of construction of the column should be compatible with the resin and other materials which contact the column to avoid resin contamination. Preferred materials include, for example, glass, polyethylene, polypropylene, PVDF and Teflon®. The physical characteristics of the column will depend on the amount of resin desired to be preconditioned and thus on the resin bed volume employed in the hydrogen peroxide purification process. The process described herein can readily be scaled to any size by persons skilled in the art.

The column is preferably pre-cleaned by first rinsing with the same type of hydrogen peroxide solution to be employed in the preconditioning, described below. Residual hydrogen peroxide in the container can next be removed by rinsing with deionized water, followed by drying the column.

The column is filled with the resin to be treated, and deionized water is passed through the column. The column is preferably fitted with metering equipment, for example one or more metering pumps are connected to the column to control the flow rate of fluids passing through the column. The deionized water is passed through the resin with a flow rate which is adjusted depending on the type and the amount of resin to be treated.

Passing the deionized water through the resin is effective to remove various contaminants from the resin. The most effective flow rate and duration of passing the deionized water through the resin varies according to the specific resin and types and amounts of contaminants present in the resin. For example, when the process is conducted for preconditioning AMBERLITE XAD-4, it has been found that the treatment of the resin with deionized water is preferably conducted for at least 100 bed volumes.

Typically, the amount of deionized water passed through the resin in the water pretreatment phase of the method of the invention is between about 20 and 200 bed volumes, preferably, between about 50 and 150 bed volumes and most preferably between about 80 and 120 bed volumes.

After the treatment of the resin with deionized water, a portion of the contaminants initially present in the resin are removed. However, residual contaminants may be remaining in the resin. Residual contaminants are generally difficult to remove by further treatment with deionized water alone. Such contaminants may include, for example, residual chloride or residual metal impurities, such as boron, calcium, iron, magnesium, zinc, potassium, silicon and sodium.

To remove or substantially reduce the amount of residual contaminants in the resin, the resin is next treated with a hydrogen peroxide solution.

When the resin is pretreated for subsequent TOC removal from hydrogen peroxide solutions, the preferred resin pretreatment hydrogen peroxide solution will have a low level of organic (TOC) impurities. Treating the resin with a low TOC hydrogen peroxide solution removes contaminants from the resin without depositing TOC impurities on the resin, thereby preserving the TOC removal capacity of the resin.

The pretreatment hydrogen peroxide solution is passed through the resin with a flow rate which is adjusted as a function of the type and the amount of resin to be treated. The resin pretreatment hydrogen peroxide solution is passed through the resin with a flow rate effective to decrease the amount of residual contaminants in the resin, which are not removed in the treatment with the step of washing the resin with deionized water as described above.

The most effective flow rate and duration of passing the hydrogen peroxide solution through the resin varies according to the specific resin and types and amounts of contaminants present in the resin. For example, when the process is conducted for preconditioning AMBERLITE XAD-4, it has been found that the treatment of the resin with a hydrogen peroxide solution is preferably conducted for at least 12 bed volumes, with a hydrogen peroxide solution flow rate through the column of 0.1 to 0.6 BV/min.

Typically, the amount of hydrogen peroxide passed through the resin in the pretreatment phase of the method of the invention is between about 3 and 20 bed volumes, preferably, between about 7 and 16 bed volumes and most preferably between about 10 and 14 bed volumes.

Employing a hydrogen peroxide solution in the pretreatment of a resin to be subsequently employed in TOC removal from (another) hydrogen peroxide solution is advantageous in that resin preconditioning and hydrogen peroxide purification are conducted with minimum downtime in the use of the equipment. Moreover, coupling resin preconditioning and hydrogen peroxide purification simplifies the equipment employed in hydrogen peroxide purification.

In one embodiment, the invention provides a hydrogen peroxide purification method including utilizing a portion of the hydrogen peroxide solution to be purified in pretreating the resin. That is, the hydrogen peroxide solution employed in pretreating the resin is obtained from the same source, for example a hydrogen peroxide storage tank, as the hydrogen peroxide solution to be purified.

During resin pretreatment, the portion of the hydrogen peroxide solution to be utilized in the pretreatment of the resin is either discarded or recycled as described above. At the end of the resin preconditioning phase, the hydrogen peroxide solution passing through the (pretreated) resin is passed through other columns in the purification unit and then directed to a point of use or stored for future use. The transition from the resin pretreatment mode to the hydrogen peroxide purification mode is simply effected by directing the hydrogen peroxide solution down stream from the (pretreated) resin column to the next purification column, i.e., an ion-exchange column, in the hydrogen peroxide purification unit.

The resin-pretreatment/hydrogen peroxide-purification process of the invention is advantageously designed such that the benefits obtained with resin pretreatment with a hydrogen peroxide solution (equipment simplicity and reduced downtime in operating the hydrogen peroxide purification unit) are balanced with the effectiveness of hydrogen peroxide purification.

In particular, it is noted that treating a resin to be utilized in TOC removal from a hydrogen peroxide solution with (another) hydrogen peroxide solution can reduce the TOC removal capacity of the resin due to the contact between the resin and the hydrogen peroxide solution during the pretreatment of the resin.

One avenue for minimizing the reduction in the TOC removal capacity of the resin upon pretreatment with a hydrogen peroxide solution is to employ a hydrogen peroxide solution having very low TOC in pretreating the resin. It should be noted that employing a low TOC content hydrogen peroxide solution in the pretreatment of the resin may offset the benefits of coupling resin pretreatment and hydrogen peroxide purification provided by utilizing the same hydrogen peroxide source for both resin pretreatment and hydrogen peroxide purification, since a single source of hydrogen peroxide can no longer be utilized in providing the hydrogen peroxide solution for the pretreatment of the resin and the hydrogen peroxide solution to be purified.

In another embodiment, the invention provides a method for determining the appropriate balance between the degree of impurity removal from a resin by treatment with a hydrogen peroxide solution and the TOC removal capacity of the pretreated resin. The amount of hydrogen peroxide solution employed in pretreating the resin is adjusted as a function of the desired residual TOC removal capacity of the resin after pretreatment.

When a high residual TOC removal capacity is desired, the amount of hydrogen peroxide employed in the resin pretreatment mode is reduced. Reducing the amount of hydrogen peroxide employed during resin pretreatment is advantageous when the operating conditions allow for the presence in the resin of relatively high amounts of contaminants without the risks for accelerated hydrogen peroxide decomposition upon contact with the resin.

Factors that may reduce hydrogen peroxide decomposition even in the presence in the resin of contaminants such as metal impurities, include conducting the hydrogen peroxide purification step at relatively low temperatures. Operating at lower temperatures offsets the acceleration of hydrogen peroxide decomposition catalyzed by the metals present in the resin.

In another embodiment of the invention, the amount of deionized water employed in the step of washing the resin with deionized water is maximized such that the amount of hydrogen peroxide passed through the resin to remove residual impurities from the resin is reduced, thereby minimizing the reduction in TOC removal capacity of the resin upon pretreatment.

Typically, washing the resin with 100 BV deionized water is sufficient to remove most impurities from the resin, thereby reducing the amount of hydrogen peroxide passed through the resin required to obtain acceptable resin pretreatment.

After the resin is washed thoroughly with deionized water, a resin pretreatment hydrogen peroxide solution is passed through the resin bed until the hydrogen peroxide assay of the solution passing through the resin is back to specification (i.e. the initial hydrogen peroxide concentration prior to passing the hydrogen peroxide solution through the resin).

When the recovered hydrogen peroxide has a concentration which is substantially equal to the starting concentration, the residual water from the step of washing with deionized water is substantially removed from the resin, and hydrogen peroxide decomposition by contact with the resin is substantially eliminated, which indicates that the impurities in the resin have been substantially removed therefrom. Typically, if a thorough washing with deionized water is conducted, acceptable resin treatment is obtained by passing about 10 BV of the hydrogen peroxide solution through the resin.

Maximizing the amount of deionized water employed in the washing step, and minimizing the amount of hydrogen peroxide passed through the resin during resin pretreatment provides numerous advantages. As noted above, minimizing the amount of hydrogen peroxide employed during pretreatment minimizes the loss in TOC removal capacity of the treated resin. Preserving the TOC removal capacity of the treated resin avoids interference with the anion/cation treatment that may be conducted in purifying a hydrogen peroxide solution after passage through a pretreated resin.

Also, employing as much deionized water as possible is highly cost effective, as the cost of deionized water is generally much less than the cost of hydrogen peroxide solutions, particularly hydrogen peroxide solutions with low TOC content.

The resin preconditioned in the above manner can be applied immediately to a hydrogen peroxide purification process or stored for later use. When the resin is not to be used immediately after preconditioning, it is preferred that the resin be stored in a contaminant free environment. For example, the resin can be placed in a clean container which is then filled with deionized water to cover the resin. The container is preferably sealed until the resin is to be used.

In accordance with a preferred aspect of the invention, resin preconditioning can be conducted in situ, in the same column used for the hydrogen peroxide TOC removal process. In such case, the resin to be preconditioned is introduced into the column, with the above-described hydrogen peroxide treatment steps being conducted in the column. If desired, the water and/or hydrogen peroxide during any of the steps can be made to continuously flow through the resin bed.

In accordance with a further aspect of the invention, a hydrogen peroxide solution can be purified by contacting the solution with a resin preconditioned as described above. In particular, resins preconditioned in accordance with the above-described process can beneficially be applied to a TOC removal process.

In yet another embodiment, the invention advantageously provides a method for pretreating a resin to be utilized in the TOC removal from a hydrogen peroxide solution which utilizes a portion of the hydrogen peroxide solution in pretreating the resin. The remaining portion of the hydrogen peroxide solution, i.e., the portion which is not utilized in pretreating the resin is then purified by contact with the pretreated resin and utilized in a process which requires low TOC hydrogen peroxide.

In one embodiment of the invention, the portion of the hydrogen peroxide solution to be utilized in the pretreatment of the resin is predetermined based on the amount of contaminants to be removed from the resin and residual TOC removal capacity to be retained by pretreated resin. The residual TOC removal capacity retained by the pretreated resin should be as close as possible to the resin's initial TOC removal capacity prior to the pretreatment. That is, the portion of the resin's TOC removal capacity used up by the pretreatment with the hydrogen peroxide solution should be minimized such that the pretreatment resin can be effectively utilized in TOC removal from the hydrogen peroxide solution to be purified.

For a given set of resin contaminant content/resin residual TOC removal capacity, a duration/number of bed volumes of a hydrogen peroxide solution to be utilized in the resin preconditioning mode is predetermined. After passage through the resin of the predetermined amount of hydrogen peroxide solution, determined for example by adjusting the flow rate of the passage of the resin pretreatment portion of the hydrogen peroxide solution through the resin, the purification unit is automatically switched to operation in hydrogen peroxide purification mode.

In another embodiment, the column containing the resin is fitted with hydrogen peroxide assay equipment upstream and down stream of the resin bed. During the resin pretreatment phase, the hydrogen peroxide concentration is measured prior to passing the hydrogen peroxide solution through the resin and after passing the hydrogen peroxide solution through the resin. The difference in hydrogen peroxide concentration indicates the degree of residual water left from rinsing or handling the resin.

When the hydrogen peroxide concentration prior to passing the solution through the resin is substantially equal to the hydrogen peroxide concentration after passage through the resin excess water has been purged from the system, the purification unit is switched to the hydrogen purification mode and the hydrogen peroxide solution exiting the TOC removal column is directed to the next step in the purification unit or to a storage tank for future use.

In the hydrogen peroxide purification mode, the resin bed is typically of a height from about 5 to 100 cm, and a diameter of from about 3 to 15 cm. The hydrogen peroxide throughput through the column is set such that all or substantially all of the organic impurities are removed from the solution as it passes through the column. The hydrogen peroxide solution to be purified is passed at a flow rate which depends on the type of resin, the resin bed volume, as well as other operating conditions, such as the pumping conditions and the pressure and temperature inside the purification reactor.

In both preconditioning and purification modes, the hydrogen peroxide solution can be passed through the resin in an upflow or a downflow mode. The hydrogen peroxide solution is preferably passed through the column in an upflow direction. Passing the hydrogen peroxide solution in an upflow direction provides numerous advantages. For example, upflow streams allow easy rise to the top and venting of gas bubbles formed by hydrogen peroxide decomposition in the column. Passing the hydrogen peroxide in an upflow direction is also advantageous in that formation of dry spots in the resin pack can be avoided, thus, reducing the risk for overheating and/or microchanneling.

Controlling the flow rate of the solution can be performed using any conventional method. For example, the column can be connected to a metering pump which controls the flow rate of the solution through the resin.

The hydrogen peroxide can be passed through one or more additional TOC removal columns, if desired. In such a case, the columns can be disposed in series and/or parallel. After passage through the TOC removal column(s), the hydrogen peroxide solution can be stored in a reservoir for future use or can be passed through one or more ion exchange columns for further purification. For example, the solution treated for TOC removal can be sent to one or more anion and cation exchange columns.

Purifying a hydrogen peroxide solution with the preconditioned resin according to the invention is advantageous in that hydrogen peroxide decomposition can be eliminated or at least minimized. As a result, the temperature in the batch reactor or column and the hydrogen peroxide content in the solution can be maintained essentially constant during purification.

In order to further illustrate the present invention and the advantages thereof, the following specific examples are given, it being understood that same are intended only as illustrative and in no way limitative. Unless otherwise indicated, all values are in ppb (parts-per-billion).

EXAMPLES

The following examples illustrate the method of preconditioning a resin according to the invention.

Example 1

This example illustrates a resin pretreatment/hydrogen peroxide purification system according to the invention.

FIG. 1 shows a schematic diagram of a system for resin pretreatment and hydrogen peroxide purification according to the invention. The system 100 includes a TOC removal column 110 containing a resin bed 125 suitable for removing organic impurities from a hydrogen peroxide solution.

The system includes a source of deionized water 130 and a source of hydrogen peroxide 120. Valve system 170 controls the flow of fluids through the column 110. The system 170 optionally includes a metering device to monitor the flow through the column 110. The system 170 also controls the supply of the deionized water and the hydrogen peroxide solution to the column 110.

During the initial phase of the pretreatment, deionized water from the source 130 is directed to the column 110. During the treatment of the resin with deionized water, the water passing through the column 110 is either disposed to waste or recycled through an ion-exchange column (not shown).

At the end of the treatment with deionized water, for example after the passage of a predetermined amount of deionized water through the column 110, the water supply to the column 110 is terminated by the control system 170, and hydrogen peroxide supply to the column 110 is initiated.

A portion of the hydrogen peroxide solution source 120 is utilized in the pretreatment of the resin. The hydrogen peroxide solution is passed through the column 110 with a flow rate controlled by the system 170. The hydrogen peroxide solution passed through the column 110 is either disposed in a waste or recycled through an ion-exchange column (not shown).

The resin treatment with hydrogen peroxide is conducted until the desired amount of contaminants is removed from the resin. The resin pretreatment phase of the process of the invention is terminated upon the removal of substantially all the metal impurities in the resin. The amount of impurities remaining in the resin can be detected through several techniques.

For example, the column 110 is fitted with hydrogen peroxide assay units 180 which allow for the determination of hydrogen peroxide decomposition after passage through the column 110. When the hydrogen peroxide assay units 180, disposed upstream and downstream the column 110 indicate substantially equal hydrogen peroxide concentrations, it is determined that the first water rinse is fully purged and product of acceptable assay is available.

Alternatively, the amount of hydrogen peroxide to be utilized is determined in advance based on measuring the amount of contaminants removable from a resin by passing a given amount of hydrogen peroxide through the resin. Based on such predetermined information, the system 170 is programmed to supply a specified amount of hydrogen peroxide to the column 110.

After the predetermined amount of hydrogen peroxide is passed through the column 110, the system 100 is switched through the control system 170 to operate in a purification mode. That is, the hydrogen peroxide solution passing through column 110 is no longer disposed in a waste but the purified hydrogen peroxide solution is either stored for future use or further purified in anion-exchange columns 150 and cation-exchange column 160, and/or directed to a point of use in a process system 190.

Directing the purified hydrogen peroxide to a point of use 190 avoids the risk of contamination of the hydrogen peroxide during storage or transportation to a remote point of use.

Example 2

The nature and amounts of contaminants present in commercial grade AMBERLITE XAD-4 resin were determined as follows.

Dry AMBERLITE XAD-4 resin (50 mL) was placed in a glass column (Spectra/Chrom) (2.5 cm×30 cm) containing Teflon® fittings and tubing into the column. Deionized water (3700 mL) was passed through the column using a ProMinent gamma G/4b metering pump at a flow rate of 20 mL/minute during which time samples of the effluent water were taken. The results of the analysis of the sample are reported in Table I.

TABLE I

ANALYTICAL RESULTS FOR H$_2$O EFFLUENT FROM RESIN

| H$_2$O, Bed VOLUMES | Ca, ppb | Fe, ppb | Mg, ppb | K, ppb | Na, ppb | Cl, ppb |
|---|---|---|---|---|---|---|
| 0 Control | <8 | <3 | <2 | 3 | 3 | 150 |
| 2 (grab) | 225 | 5 | <2 | 1900 | 7920000 | NA |
| 66 (grab) | 218 | <3 | <2 | 3 | 187 | 270 |
| 2–60 (comp) | 47 | <3 | 2 | 46 | 93000 | 160000 |

The results reported in Table I show that commercial AMBERLITE XAD-4 contains a number of impurities which can adversely affect the hydrogen peroxide purification process. In particular, the results show that the resin contains impurities including chloride (Cl) and metal impurities, including iron (Fe), magnesium (Mg), calcium (Ca), potassium (K), and sodium (Na), which metals are known to promote the autocatalytic decomposition reaction.

The results of Table I further demonstrate that large portions of the chloride, the sodium, and calcium can be removed by treating the resin with deionized water alone.

Figure 2:
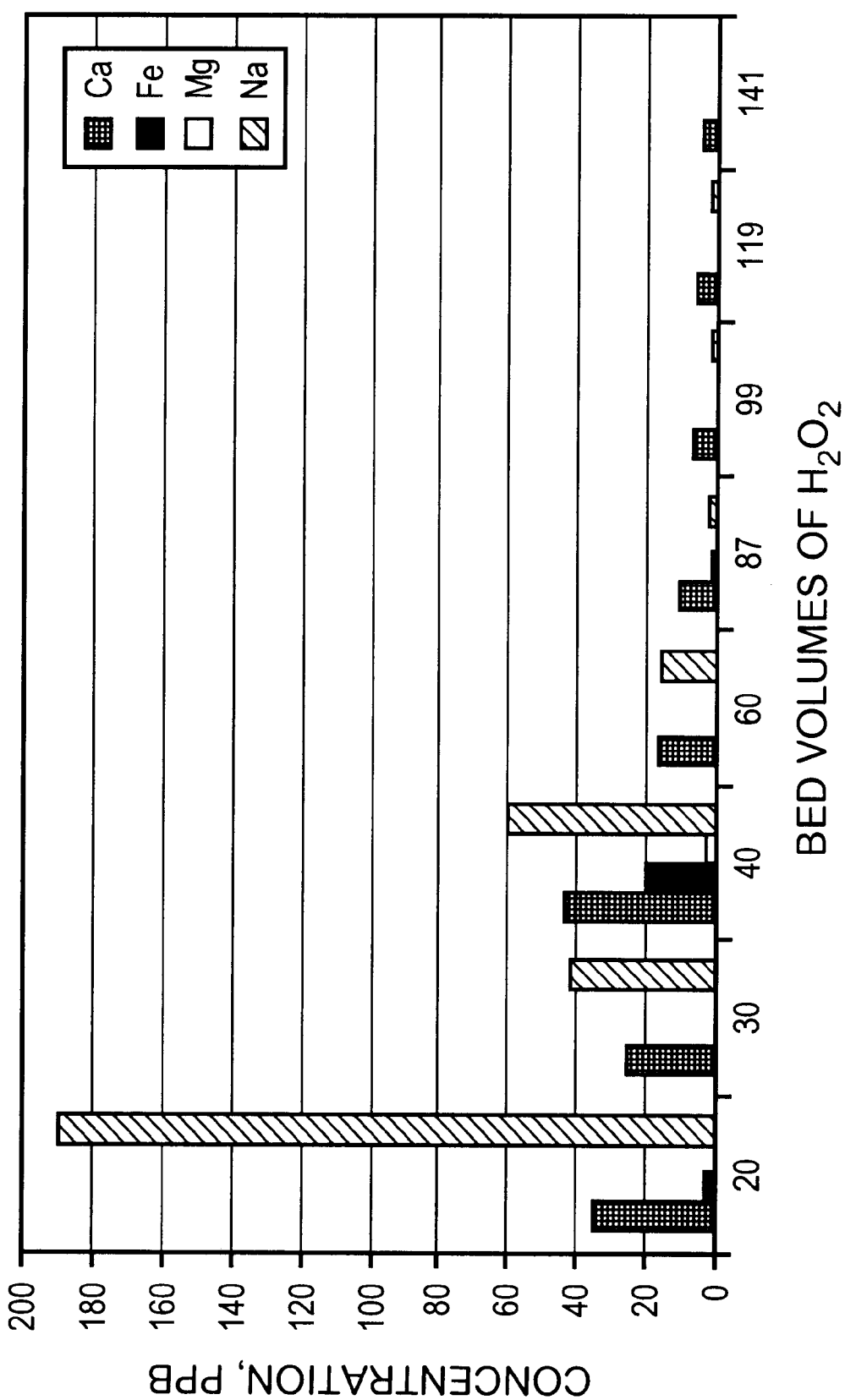
FIG. 2 is a bar chart showing removal of metal impurities from an AMBERLITE XAD-4 resin as a function of the number of bed volumes of hydrogen peroxide passed through the resin.
Figure 3:
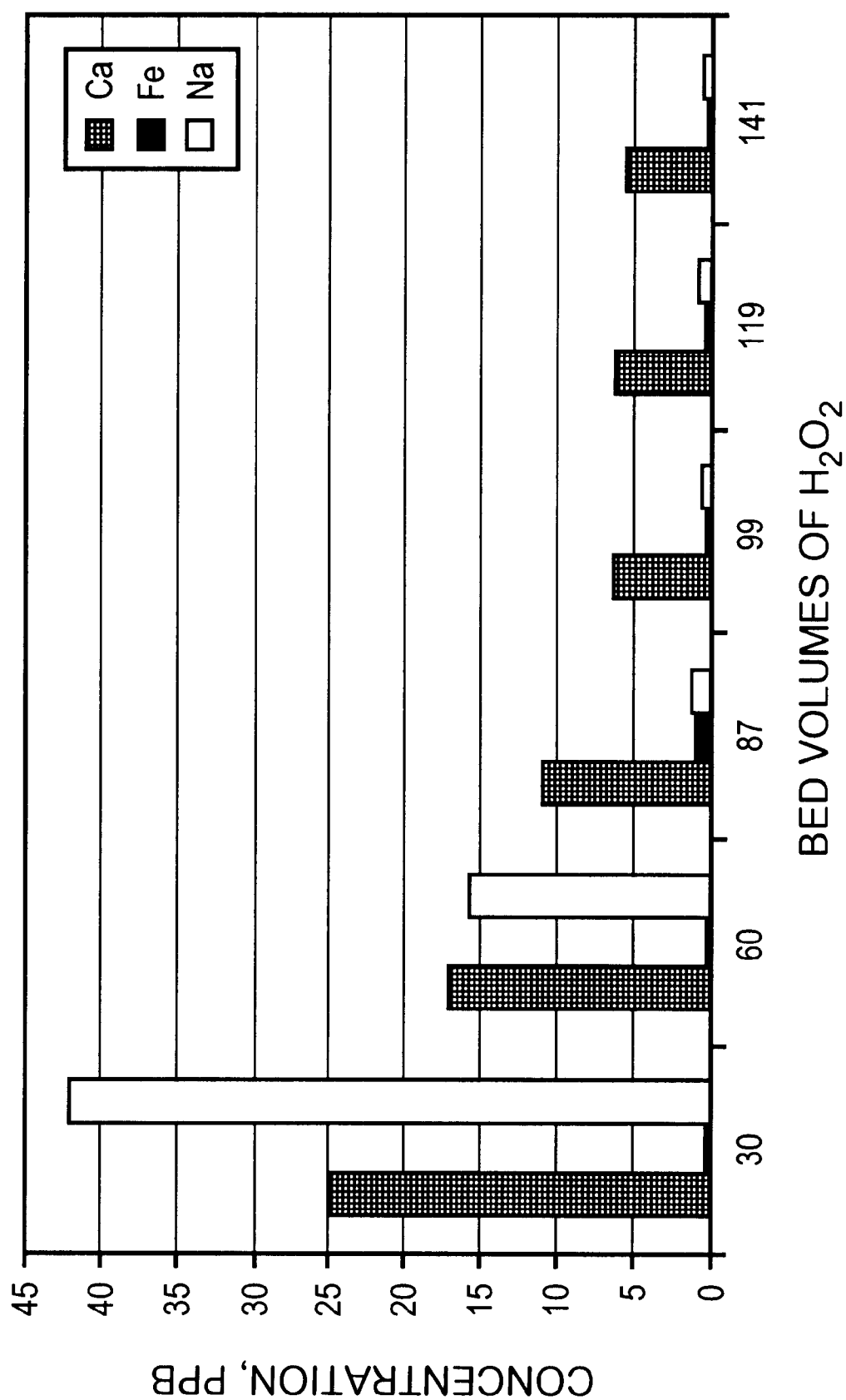
FIG. 3 is a magnified view of the bar chart shown in FIG. 1.

Another experiment using a flow rate of 35/mL per minute for 5000 mL deionized water followed by 30% hydrogen peroxide (7000 mL) was performed, and samples of the hydrogen peroxide were taken. Analyses for metals and chloride were performed. Hydrogen peroxide (Solvay Interox UHP, 10 ppb grade) was purged from the column using deionized water at between 10 and 141 hydrogen peroxide bed volumes. Upon receipt of analytical results, the deionized water left on the column was removed and 30% hydrogen peroxide was again passed through the column containing the Amberlite XAD-4 resin The results are shown in Table II and FIGS. 2 and 3.

TABLE II

ANALYTICAL RESULTS FOR 30% $H_2O_2$

| $H_2O$, Bed VOLUMES | Ca, ppb | Fe, ppb | Mg, ppb | K, ppb | Na, ppb | Cl, ppb |
|---|---|---|---|---|---|---|
| 0 Control | 0.3 | <0.05 | 0.05 | 0.03 | 0.2 | 3.0 |
| 10 | 402 | 0.75 | 0.68 | 0.32 | 11 | 46 |
| 20 | 35 | 0.33 | 0.24 | 26 | 190 | 42 |
| 30 | 25 | 0.20 | 0.21 | 0.27 | 42 | 44 |
| 60 | 17 | 0.21 | 0.19 | 0.40 | 24 | 37 |
| 87 | 11 | 0.93 | 0.48 | 0.91 | 1.3 | 68 |
| 99 | 6.3 | 0.39 | 0.18 | 0.17 | 0.6 | 30 |
| 118 | 6.3 | 0.40 | 0.23 | 0.54 | 0.9 | 31 |
| 141 | 5.5 | 0.25 | 0.24 | 0.22 | 0.5 | 37 |

This experiment showed the quantity of hydrogen peroxide used to lower the metal contamination present on AMBERLITE XAD-4 resin prior to use. Calcium in the hydrogen peroxide effluent remained above 5 ppb throughout this experiment but did drop from a high of 402 ppb at 10 bed volumes of hydrogen peroxide to 11 ppb at 87 bed volumes of hydrogen peroxide. The use of hydrogen peroxide to clean this resin must be balanced between the cation exchange capacity used up to remove the calcium leached from the resin and the Total Organic Carbon (TOC) removal capacity used up in treatment of the LITE XAD-4 resin with 30% hydrogen peroxide. It has been shown that the AMBERLITE XAD-4 resin can remove TOC from 400 bed volumes of hydrogen peroxide, and the hydrogen peroxide necessary to lower calcium to 11 ppb uses up 22% of the TOC removal capacity of the AMBERLITE XAD-4 resin.

Table III shows the effect on cation-exchange resin if the metal impurities on the Amberlite XAD-4 resin were allowed to pass through the cation-exchange column instead of being discarded.

TABLE III

EFFECT ON RESIN OF METAL IMPURITIES ON THE XAD-4 AMPERLITE

| TREATMENT | % 650C USED | MEQ FROM XAD-4 | MEQ ON 650C |
|---|---|---|---|
| None | 580 | 32000 | 5500 |
| 2 BV DI | 172 | 9460 | 5500 |
| 70 BV DI | 65 | 3575 | 5500 |
| 100 BV DI | 2 | 100 | 5500 |

Figure 4:
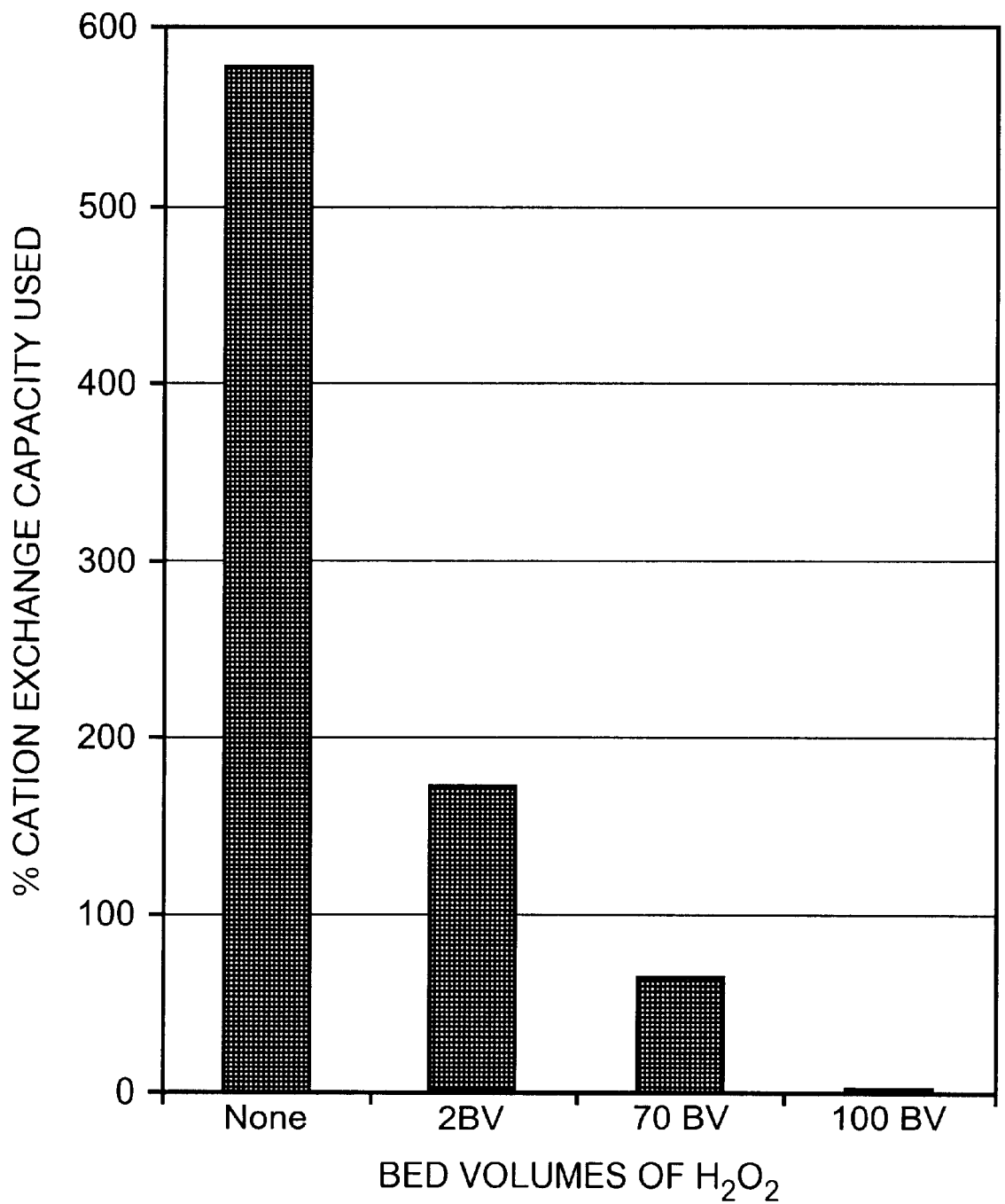
FIG. 4 is a bar chart showing ion-exchange capacity for removing impurities from a hydrogen peroxide solution passed through a resin treated according to the invention.

FIG. 4 is a bar chart showing ion-exchange capacity for removing impurities from a hydrogen peroxide solution passed through a resin treated according to the invention.

While the invention has been described in detail with reference to specific embodiments thereof, it will be apparent to those skilled in the art that various changes and modifications can be made, and equivalents employed, without departing from the scope of the claims which follow.

What is claimed is:

1. A method of purifying a hydrogen peroxide solution, comprising:
   (a) preconditioning a resin by a method comprising (i) washing the resin with deionized water to produce a washed resin, and (ii) contacting an effective amount of a preconditioning hydrogen peroxide solution with the washed resin to remove impurities from the washed resin, thereby producing a preconditioned resin;
   (b) passing a hydrogen peroxide solution to be purified through a bed of the preconditioned resin to form a hydrogen peroxide solution having a TOC content lower than a TOC content of the hydrogen peroxide solution to be purified; and
   (c) passing the hydrogen peroxide solution having a TOC content lower than TOC content of the hydrogen peroxide solution to be purified through one or more ion-exchange resin beds,
   wherein the preconditioning hydrogen peroxide solution does not pass through the ion exchange resin beds.

2. The method of claim 1, wherein the preconditioning hydrogen peroxide solution and the hydrogen peroxide solution to be purified are supplied from the same hydrogen peroxide source.

3. The method of claim 1, wherein the preconditioned resin has a TOC removal capacity of about 50% or more of the resin's TOC removal capacity prior to preconditioning, and a residual impurity level of about 100 ppb or less.

4. The method of claim 1, wherein the preconditioned resin has a TOC removal capacity of about 80% or more of the resin's TOC removal capacity prior to preconditioning.

5. The method of claim 1, further comprising opening a valve in a conduit between the resin bed and the ion-exchange resin beds after step (a) is completed.

6. The method of claim 5, wherein the valve in the conduit is opened after passing a predetermined amount of the preconditioning hydrogen peroxide solution through the resin during step (a).

7. The method of claim 5, further comprising:
   (a') assaying the preconditioning hydrogen peroxide solution after contact with the resin, and opening the valve when a predetermined hydrogen peroxide concentration has been reached.

8. The method of claim 7, wherein the assaying is performed using a hydrogen peroxide concentration sensor downstream of the resin.

9. The method of claim 8, wherein the valve is automatically controlled based on a measurement signal from the concentration sensor.

10. The method of claim 7, wherein assaying the hydrogen peroxide is conducted after passing more than about 10 BV preconditioning hydrogen peroxide solution through the resin.

11. The method of claim 5, wherein the valve in the conduit is opened after a predetermined amount of time has passed from starting the passing of the preconditioning hydrogen peroxide solution through the washed resin.

12. The method of claim 1, wherein the preconditioning hydrogen peroxide solution contains about 10 wt % or more hydrogen peroxide, based on the solution.

13. The method of claim 12, wherein the preconditioning hydrogen peroxide solution contains about 30 wt % hydrogen peroxide, based on the solution.

14. The method of claim 1, wherein the volume of the deionized water passed through the resin in step (a) is from about 20 to 200 bed volumes.

15. The method of claim 1, wherein the volume of the preconditioning hydrogen peroxide solution passed through the resin in step (a) is from about 3 to 20 bed volumes.

16. The method of claim 15, wherein the volume of the preconditioning hydrogen peroxide solution passed through the resin in step (a) is from about 7 to 16 bed volumes.

17. The method of claim 1, wherein the resin is hydrophobic.

18. The method of claim 1, wherein the resin is AMBERLITE XAD-4.

19. A method of purifying a hydrogen peroxide solution, comprising:
- (a) preconditioning a resin by a method comprising (i) washing the resin with deionized water to produce a washed resin, and (ii)contacting an effective amount of a preconditioning hydrogen peroxide solution with the washed resin to remove impurities from the washed resin, thereby producing a preconditioned resin;
- (b) passing a hydrogen peroxide solution to be purified through a bed of the preconditioned resin to form a hydrogen peroxide solution having a TOC content lower than a TOC content of the hydrogen peroxide solution to be purified; and
- (c) directing the hydrogen peroxide solution having a TOC content lower than a TOC content of the hydrogen peroxide solution to be purified to a point of use in a semiconductor manufacturing facility through a conduit disposed between the bed of preconditioned resin and the point of use, wherein the preconditioning hydrogen peroxide solution is not directed to the point of use.

20. A method of purifying a hydrogen peroxide solution, comprising:
- (a) preconditioning a resin by a method comprising (i) washing the resin with deionized water to produce a washed resin, and (ii) contacting an effective amount of a preconditioning hydrogen peroxide solution with the washed resin to remove impurities from the washed resin, thereby producing a preconditioned resin;
- (b) passing a hydrogen peroxide solution to be purified through a bed of the preconditioned resin to form a hydrogen peroxide solution having a TOC content lower than a TOC content of the hydrogen peroxide solution to be purified;
- (c) passing the hydrogen peroxide solution having a TOC content lower than a TOC content of the hydrogen peroxide solution to be purified through one or more ion-exchange resin beds to form a purified hydrogen peroxide solution; and
- (d) directing the purified solution to a point of use in a semiconductor manufacturing facility through a conduit disposed between the one or more ion-exchange resin beds and the point of use, wherein the preconditioning hydrogen peroxide solution does not pass through the ion exchange resin beds and is not directed to the point of use.

* * * * *